(12) United States Patent
Trainin

(10) Patent No.: US 7,421,521 B2
(45) Date of Patent: Sep. 2, 2008

(54) SYSTEM, METHOD AND DEVICE FOR REAL TIME CONTROL OF PROCESSOR

(75) Inventor: Solomon Trainin, Haifa (IL)

(73) Assignee: Intel Corporation, Santa Clara ( * ) Notice: Subject to any disclaimer, the term of this patent is extended or adjusted under 35 U.S.C. 154(b) by 345 days.

(21) Appl. No.: 10/816,846

(22) Filed: Apr. 5, 2004

(65) Prior Publication Data

US 2005/0228919 A1   Oct. 13, 2005

(51) Int. Cl.
*G06F 3/00* (2006.01)
(52) U.S. Cl. .................. 710/45; 710/262; 710/244
(58) Field of Classification Search ............ 710/260, 710/45; 375/295, 316
See application file for complete search history.

(56) References Cited

U.S. PATENT DOCUMENTS

| | | | | |
|---|---|---|---|---|
| 5,404,536 A | * | 4/1995 | Ramakrishnan et al. | 710/220 |
| 5,416,911 A | * | 5/1995 | Dinkjian et al. | 712/225 |
| 5,553,292 A | * | 9/1996 | Daly et al. | 710/260 |
| 5,579,525 A | * | 11/1996 | Suzuki | 710/260 |
| 5,642,348 A | * | 6/1997 | Barzegar et al. | 370/277 |
| 5,694,613 A | * | 12/1997 | Suzuki | 712/231 |
| 5,751,707 A | * | 5/1998 | Voit et al. | 370/384 |
| 5,809,331 A | * | 9/1998 | Staats et al. | 710/10 |
| 5,812,930 A | * | 9/1998 | Zavrel | 725/62 |
| 6,023,740 A | * | 2/2000 | Korhonen et al. | 710/45 |
| 6,064,649 A | * | 5/2000 | Johnston | 370/310.2 |
| 6,377,782 B1 | * | 4/2002 | Bishop et al. | 455/3.01 |
| 6,467,008 B1 | * | 10/2002 | Gentry et al. | 710/261 |
| 6,629,180 B1 | * | 9/2003 | Attimont et al. | 710/262 |
| 6,633,941 B2 | * | 10/2003 | Dunlap et al. | 710/262 |
| 6,816,935 B1 | * | 11/2004 | Gulick | 710/260 |
| 6,981,084 B2 | * | 12/2005 | Connor | 710/260 |
| 6,990,665 B2 | * | 1/2006 | Ballantyne | 718/100 |
| 2003/0016770 A1 | * | 1/2003 | Trans et al. | 375/346 |
| 2004/0120292 A1 | * | 6/2004 | Trainin | 370/338 |

OTHER PUBLICATIONS

James Peterson and Abraham Silberschatz, "Operating System Concepts", 1985, Addison Westley, 2nd Ed., pp. 121-122.*
Intel Pro/100 S Desktop Adapter. Intel, 2005.*
Definition of IEEE 802.11 from Wikipedia, unknown date.*
Definition of Wi-Fi from Wikipedia, unknown date.*
U.S. Appl. No. 10/322,880, Solomon B.T rainin.
Dravopoulos, et al., "On Adaptive DLC mechanisms for Fixed Broadband Wireless Networks", IST Mobile Communications Summit 2000, Galway, Ireland, Oct. 1-4, 2000.

* cited by examiner

*Primary Examiner*—Khanh Dang
(74) *Attorney, Agent, or Firm*—Pearl Cohen Zedek Latzer, LLP

(57) ABSTRACT

A method and device of synchronizing interrupts of a processor with, for example, signals from a synchronization unit such as, for example, a slot timer. In advance of the start of a slot as may, for example, be indicated by a signal from, for example, a slot timer, a state machine may schedule the function that will be permitted to interrupt a processor. Only the scheduled function may interrupt the processor during the slot. Time dependent functions that may be waiting to be processed may have to wait until the start of a next slot. Background functions that are too large to be processed within the time available in a slot may, for example, be divided into segments, each of such segments capable of being processed within the time available in a slot.

30 Claims, 6 Drawing Sheets

SYSTEM, METHOD AND DEVICE FOR REAL TIME CONTROL OF PROCESSOR

BACKGROUND OF THE INVENTION

A central processing unit (CPU) such as for example a processor that may be included in a network interface card (NIC) for wireless communication may in some cases process only one function or command at a time. In some cases, once the processing of a particular function or command is begun, such processing must be completed without interruption of the CPU from other commands or other functions.

Some programs implementing protocols or standards, such as for example standards that may be used in wireless communications such as for example IEEE std. 802.11-1999 (published 1999; ISO/IEC 802-11:1999), 802.11a and 802.11b, may require periodic or regular execution of low priority or background functions such as for example load estimation for power management or link analysis for link control. While the execution of these or other background functions may be delayed until a CPU is free or available, once the execution of a background function begins, it may in some cases not be interrupted until its execution is completed. On the other hand, the amount of time that may be required to process a background command to completion may be more than the time available between time-dependent events such as, for example, receive (Rx) commands that may come from other NICs, or transmit (Tx) commands that may come from, for example, a host to which a NIC may be connected. A delay of more than a brief period in the execution of such time-dependent commands may impair processing of such time-dependent commands.

BRIEF DESCRIPTION OF THE DRAWINGS

Embodiments of the invention will be understood and appreciated more fully from the following detailed description taken in conjunction with the drawings in which.

DETAILED DESCRIPTION OF THE INVENTION

Figure 1:
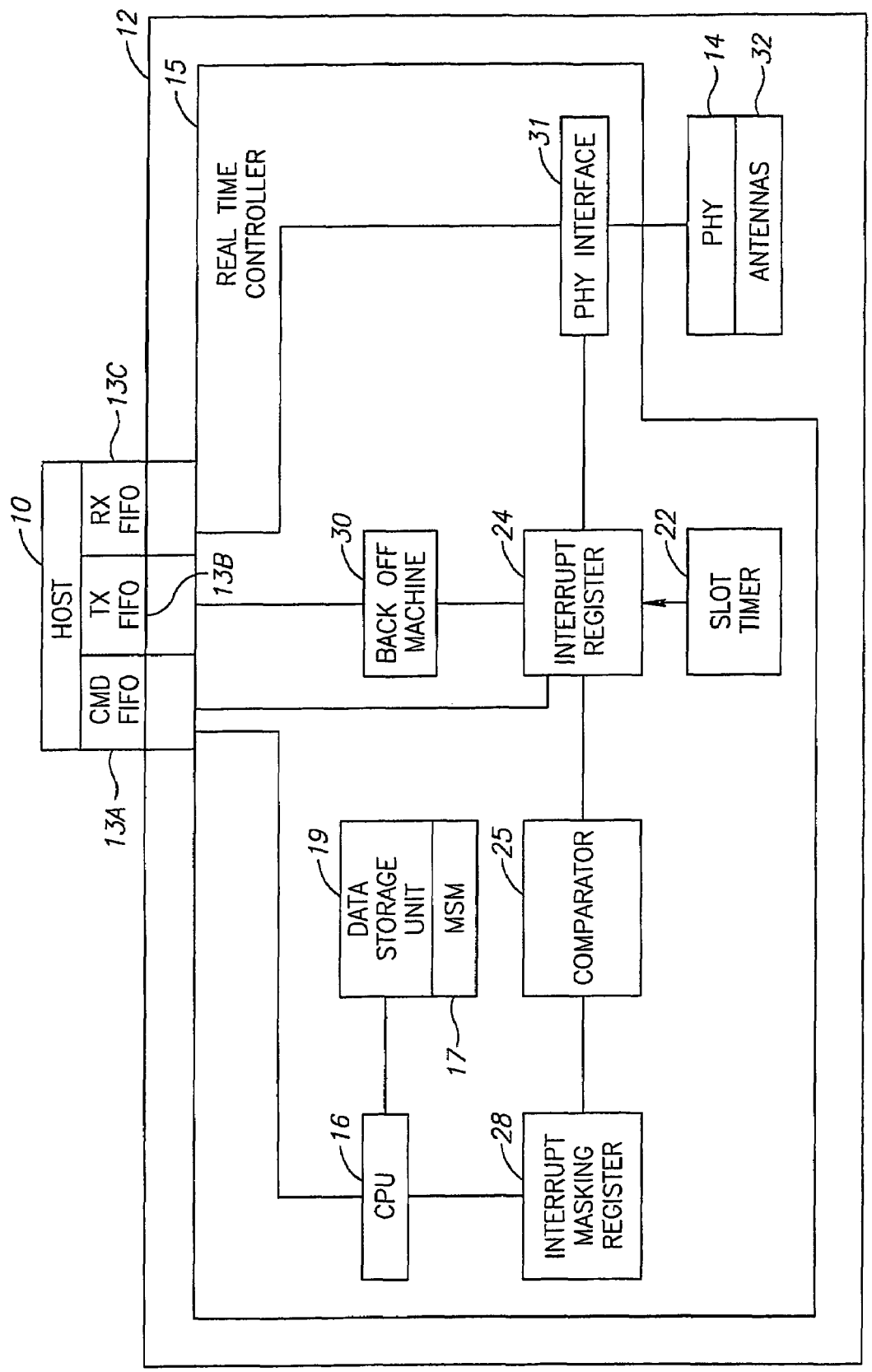
FIG. 1 is a schematic diagram of certain components of a host computer and a NIC in accordance with an exemplary embodiment of the invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention. Various examples are given throughout this description. These are merely descriptions of specific embodiments of the invention, but the scope of the invention is not limited to the examples given. Features described with respect to one embodiment may be included in other embodiments though not described therein.

Unless specifically stated otherwise, as apparent from the following discussions, it is appreciated that throughout the specification, discussions utilizing terms such as "processing," "computing," "calculating," "determining," or the like, refer to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices.

The processes presented herein are not inherently related to any particular computer, processing device, article or other apparatus. For example, embodiments of the invention may be used to operate a processor used in a wireless communication system such as for example in an NIC or in another component of a wireless communication system. Embodiments of the invention may also be used in the operation of a processor in a communication system over wires, or in computing systems that may or may not be used for communication. A desired structure for a variety of these systems will appear from the description below. In addition, embodiments of the present invention are not described with reference to any particular processor, programming language, machine code, etc. It will be appreciated that a variety of programming languages, machine codes, etc. may be used to implement the teachings of the invention as described herein. Descriptions in this application of items in one embodiment may be included in other embodiments even though they are not described in such other embodiments.

In addition to other definitions as may be known in the art, the terms 'background' function or 'background' command as used in this application may refer to a function whose execution may not be time-dependent or whose execution at a particular time may be less critical or time-dependent than the execution of other functions at such time. Such background functions or commands may be required by a protocol or a standard such as for example by a wireless communication standard, and may in some embodiments not be initiated by an outside source such as for example by another NIC. A command may include a block or series of instructions and may correspond to a request from an external source such as for example another NIC or a protocol that may be operating in a NIC. A command may correspond to a series of machine language commands.

In addition to the other definitions as may be known in the art, the term 'slot' may refer to an interval between link events or frame sequences. In some embodiments, the interval between frame sequences may be aligned or synchronized on the basis of slots. For example, in relation to IEEE std. 802.11-1999 a slot may include a period of for example 9 microseconds. Other lengths of time are possible, and other designated periods of time during which functions may be executed or around which actions may be synchronized may in some embodiments be considered a slot.

Reference is made to FIG. 1, a schematic diagram of certain components of a host computer and an NIC in accordance with an exemplary embodiment of the invention. Host 10 may be connected to NIC 12 by among other components one or more first-in-first-out (FIFO) 13 paths over which commands and data may be transferred for example between host 10 and NIC 12. In some embodiments FIFO 13 may have several parts or paths that may carry various commands or data. For example, a FIFO 13 may include a command FIFO 13A, one or more Tx FIFOs 13B and one or more Rx FIFOs 13C. NIC 12 or host 10 may include one or more antennas such as for example a dipole antenna 32 that may be connected to a physical (PHY) layer 14 signaling control device. Other suitable antennas may be used. In some embodiments, a PHY interface 31 may link PHY layer 14 with real time controller (RTC) 15. RTC 15 may in some embodiments control the timing of the processing of functions within NIC 12.

NIC 12 may include among its components a CPU 16 as part of or connected to RTC 15. RTC 15 may include or be operably connected to, for example, one or more timers such as, for example, a slot timer 22 which may, for example, time and issue signals upon the occurrence of, or at the beginning of slot periods. In some embodiments of the invention, RTC 15 may be controlled by Main State Machine (MSM) 17 that may be implemented as hardware, software or as combination of hardware and software. In some embodiments, MSM 17 may be executed by CPU 16. In some embodiments, the instructions of MSM 17 may be stored within a data storage medium or memory storage unit 19 that may be operably connected to CPU 16.

RTC 15 may include or be operably connected to one or more registers. Such registers may include, for example, an interrupt register 24 and an interrupt masking register 28. In some embodiments such registers may be included in one or more data storage mediums and may be divided or combined into more or fewer physical storage spaces. In some embodiments such registers may be included in a single register or in another data storage unit. A comparator 25 may in some embodiments compare the values that may be stored in entries of such registers. RTC 15 may also include a BACKOFF machine 30 as is known.

In some embodiments, NIC 12 may be a unit or component of a unit that enables wireless communication between a wireless network and, for example, a host such as, for example, a laptop computer, hand-held device, access point or other unit. In some embodiments a NIC 12 may be in a form other than a card. In some embodiments NIC 12 may be removable from host 10 or may be fixed as a part of host 10.

In some embodiments of the invention, interrupts of a CPU 16 may be permitted or enabled only at specific intervals such as for example at particular phases of a slot or of another interval as such interval may be signaled by a synchronization unit such as, for example, a timer or slot timer 22 that may be included in or connected to CPU 16. In some embodiments such interrupts may only be made by functions that are scheduled for interrupting the CPU 16 during a phase that may occur in advance of the start of a slot. A timer may synchronize the scheduling of interrupts with the timing of wireless link events or with the time between frame sequences. A time-dependent function may wait to be processed until the start of a next slot. Background functions whose processing by CPU 16 may take longer than the time available in a slot may be divided into segments or sections that may be processed within the time available in a slot.

Figure 2:
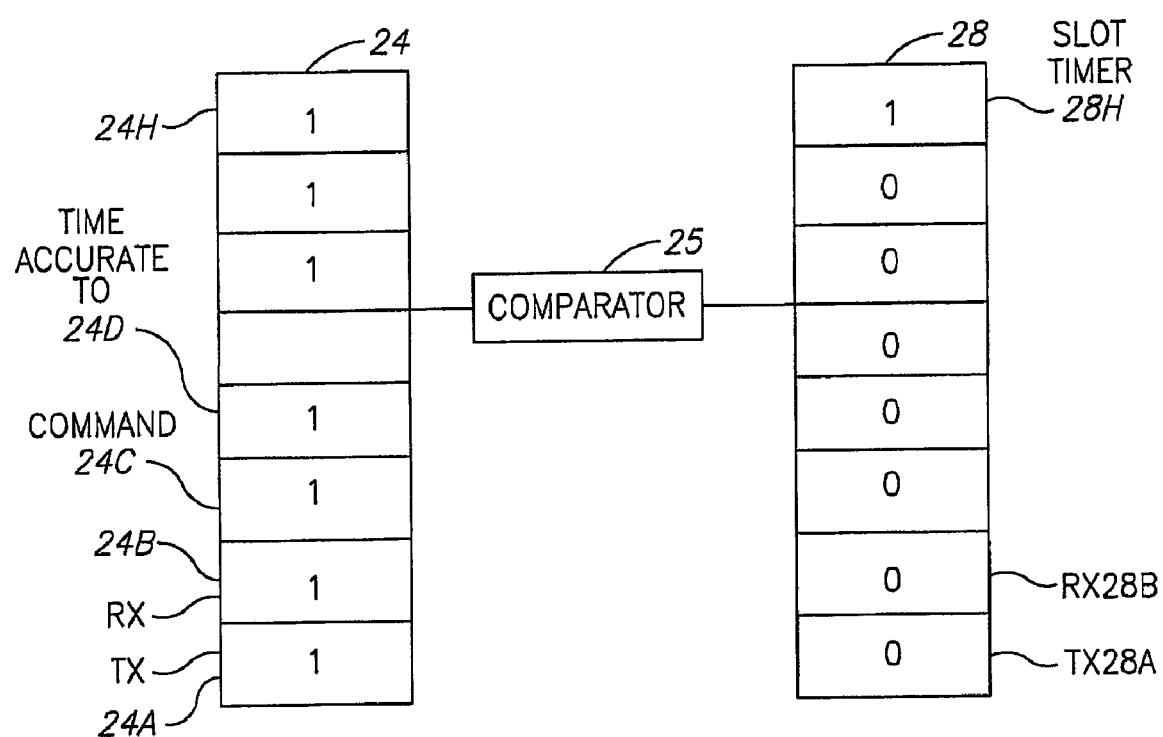
FIG. 2 is a schematic diagram of registers that may be included in a real time controller in accordance with an exemplary embodiment of the invention.

Reference is made to FIG. 2, a schematic diagram of registers that may be included in RTC 15 in accordance with an exemplary embodiment of the invention. A register such as, for example, an interrupt register 24 may store an indication of the functions that may at a particular time be waiting to be processed by CPU 16. For example, a BACKOFF machine 30, as shown in FIG. 1 may issue a Tx ready signal that may result in a suitable symbol such as, for example, a 1 being stored in a designated position 24A of interrupt register 24 as an indication that a Tx command is waiting to be processed by CPU 16. In another example, PHY interface 31 may issue an Rx ready signal that may result for example in a 1 being stored in a designated position 24B of interrupt register 24 to indicate that an Rx function is waiting to be processed. Command FIFO 13A may deliver a signal to store a 1 in a designated position 24C of interrupt register 24 if other types of function are waiting to be processed and a time accurate function may deliver a signal to store a 1 in a designated position of interrupt register 24. Slot timer 22 may issue a signal to store for example a 1 in a designated position 24H of interrupt register 24 to indicate that a slot has expired. Other positions may be used to designate particular commands or functions to be processed, and structures other than a register may be used to store such indications. Symbols other than 1, such as for example 0 or symbols having multiple digits may be used to signal or represent an interrupt or other codes used herein.

In some embodiments, a pre-determined basis of priority may be used to order the functions to be processed by CPU 16. For example, in some embodiments, time-dependent commands such as Tx and Rx may have a higher priority than a background command. As a result, if they are stored in, for example, interrupt register 24 a 1 or other suitable symbol in positions 24A and 24H to indicate that both a Tx command and a background command are waiting to be processed, the Tx command may be processed first. Other priority arrangements are possible and other bases for determining which function to process are possible.

Interrupt masking register 28 may store an indication of whether an interrupt of CPU 16 is to be permitted or enabled at a particular time, or alternatively whether an interrupt is to be masked or avoided during for example the execution of another command. For example, in some embodiments, processing of a Tx command may take longer than the time that would ordinarily be available during a slot. In such case a next slot signal may be masked by, for example, storing a 0 or other suitable symbol in for example position 28H of interrupt masking register 28 to indicate that slot timer 22 should not interrupt CPU 16 until the processing of the Tx command has been completed. In another example, if at a particular time a background function is waiting to be processed, CPU 16 may store a 1 or other suitable symbol in, for example, bit position 28H to indicate that slot timer 22 is to interrupt CPU 16 at the next slot, and may in some embodiments store a 0 in all other positions of interrupt masking register 28 to indicate that none of such other functions may interrupt CPU 16. In another example, if at a particular time there are no background commands to be processed, CPU 16 may store a 0 in, for example, bit position 28H to indicate that slot timer 22 should not interrupt CPU 16, and may store a 1 or other suitable symbol in some or all other positions of interrupt masking register 28 to indicate that other commands that may arrive to be processed may interrupt CPU 16. Such designated positions may include, for example, a designated position 28A used to store a signal that will enable an interrupt by a Tx function, designated position 28B that may store a signal that will enable an interrupt by an Rx function or other designated positions corresponding to other functions that may interrupt CPU 16. Indications of functions that may interrupt a CPU 16 may be designated in other locations or by other methods. Other suitable interrupt or masking codes may be used.

In some embodiments RTC 15 may include a comparator 25 that may, for example, compare or evaluate values that are stored in interrupt register 24 and interrupt masking register 28, to each other or to fixed values. For example, comparator 25 may compare the values stored in, for example, position 24H of interrupt register 24 and 28H of interrupt masking register 28, to determine whether both of such values are 1. In some embodiments, if the values stored in positions in interrupt register 24 and interrupt masking register 28 are both, for example, 1 and such positions correspond to a single function, then MSM 17 may permit the command corresponding to such bit position to interrupt CPU 16. In some embodiments the function to permit an interrupt by a particular command may be expressed as interrupt (INT)=IR(j) AND IMR(j), such that a particular command will be permitted to interrupt CPU 16 if, for example, a 1 is stored in a designated position (j) of both interrupt register (IR) 24 and interrupt masking register (IMR) 28, and such designated positions correspond to such particular command. For example, if CPU 16 determines that there is a background function to be processed, it may store a 1 in a designated position 28H of interrupt masking register 28 corresponding to slot timer signal to indicate that a signal from slot timer 22 should not be masked so that a next slot may begin. Upon the expiration of a slot and in advance of the start of a next slot, slot timer 22 may issue a signal to store, for example, a 1 in designated position 24H of interrupt register 24. As the corresponding positions of both interrupt register 24 and interrupt masking register 28 are both 1, the slot timer signal may interrupt CPU 16. In some embodiments, different positions in one or more registers may correspond to a particular command. Other comparisons or relative evaluations may be made, and other commands may be processed.

Figure 3:
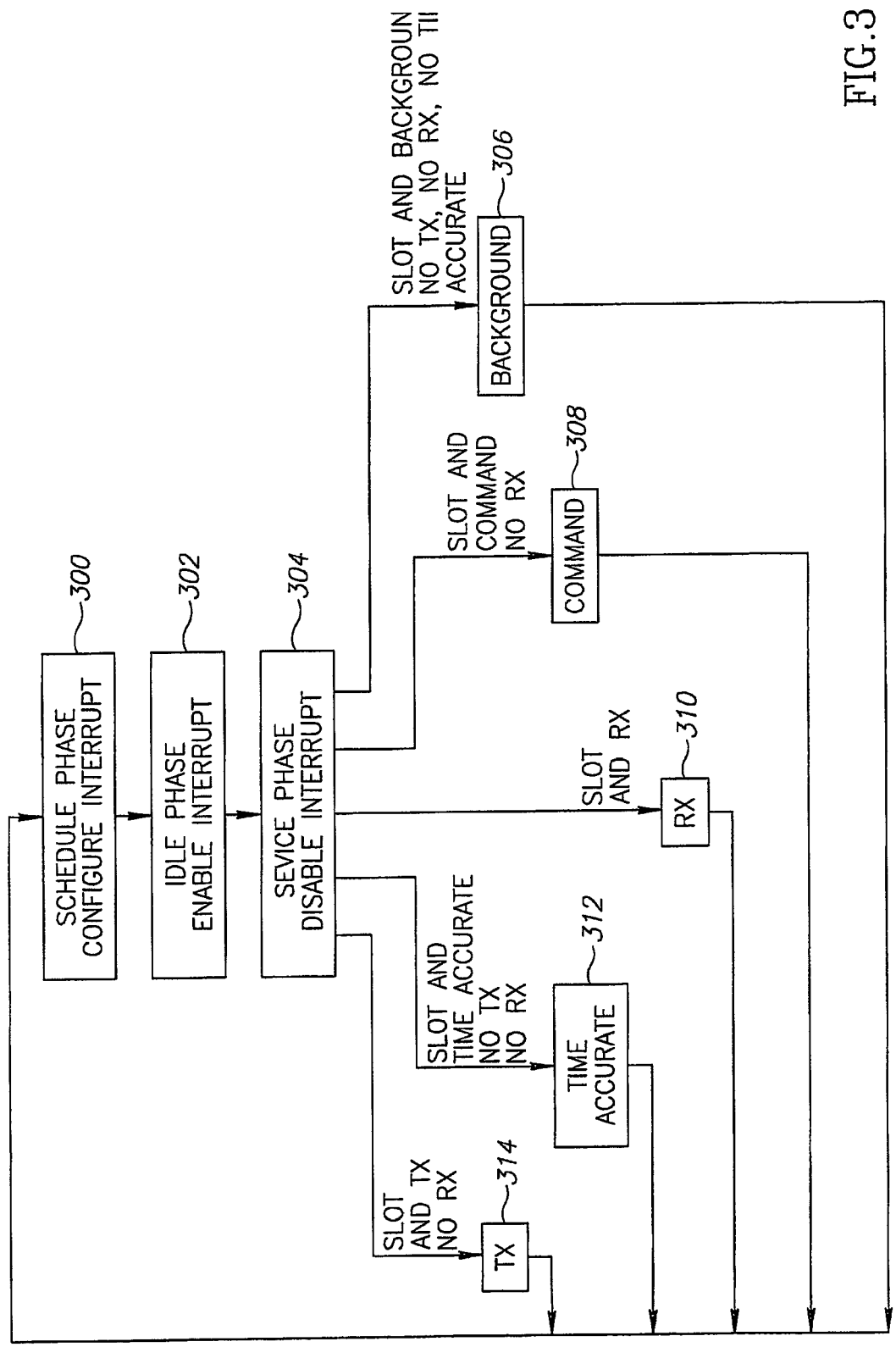
FIG. 3 is a flow chart depicting phases of a state machine in accordance with an exemplary embodiment of the invention.

Reference is made to FIG. 3, a flow chart depicting phases of an MSM 17 in accordance with an exemplary embodiment of the invention. In some embodiments MSM 17 may be stored as coded instructions in static random access memory and may be executed by CPU 16. In some embodiments, MSM 17 may be said to occupy one of at least three phases, namely a schedule phase, an idle phase and a service phase. Other designations of phases may be used, a different number of phases may be included and phases may be combined into non-discrete periods. In block 300 an MSM 17 may be in a schedule phase. Schedule phase may occur, for example, in advance of the beginning of a slot or other time interval. During schedule phase, MSM 17 may for example configure registers such as interrupt masking register 28 as described in the explanation of FIG. 2 above, to enable an interrupt by, for example, slot timer 22 or by another function to be processed. In block 302, an idle phase may in some embodiments follow a schedule phase. In idle phase the configured interrupt may be enabled and a CPU 16 may be inactive or waiting for the interrupt to occur. In block 304, MSM 17 may enter a service phase during which a selection may be made among the functions that are waiting to be processed. The waiting functions may be indicated by values stored in, for example, interrupt register 24. In some embodiments the selection among the functions may be made on the basis of a predetermined priority of the functions. In a service phase, CPU 16 may begin to process the scheduled functions, and further interrupts by other functions during the slot may be disabled. A time-dependent function that may arrive to be processed after the processing of a different function has begun in a slot may have to wait to be processed until the beginning of the next slot.

An interrupt and a function that may be scheduled during a slot may include, for example, and as is indicated in block 306, a slot interrupt and the processing of a background function. Interrupts by other functions such as, for example, Tx or Rx functions during the particular slot may be prohibited. The conditions for the scheduling of a background function may be, for example, the arrival of a signal from a slot timer, the presence of a background function waiting to be processed, and the absence of Tx, Rx, time accurate or other more important functions waiting to be processed. The scheduled functions may include, for example, and as in indicated in block 308 a slot interrupt and the processing of some other command, and may prohibit interrupts from any other function during the particular slot. The conditions for the scheduling of a command may be the arrival of a signal from a slot timer, a command waiting to be processed, and that there are no Rx functions waiting to be processed. The scheduled functions may include, for example, and as is indicated in block 310, a slot interrupt and an Rx function, and may prohibit interrupts from any other function during the particular slot. The conditions for the scheduling of an Rx function may be the arrival of a signal from a slot timer and an Rx waiting to be processed. The scheduled functions may include, for example, and as is indicated in block 312 a slot interrupt and a time accurate function, and may prohibit interrupts from any other functions such as, for example, Tx and Rx functions during the particular slot. The conditions for scheduling a time accurate function may be for example the arrival of a signal from a slot timer, a time accurate function that is waiting to be processed, and that there are no Tx or Rx functions waiting to be processed. The scheduled functions may include, for example, and as is indicated in block 314, a slot interrupt and an Tx function and may prohibit interrupts from any other function such as, for example, an Rx function during the particular slot. The conditions for scheduling a Tx function may be the arrival of a signal from a slot timer, a Tx function waiting to be processed, and that there are no Rx functions waiting to be processed.

In some embodiments, the schedule, idle and service phases may occur sequentially and may be followed by a period in which the enabled function is executed. In some embodiments, the phases of the MSM 17 may be repeated such that after a function has been executed to completion, the MSM 17 may return to a schedule phase to configure the interrupts of a next slot.

For example, during a scheduling phase, CPU 16 may determine that an interrupt of a CPU 16 by, for example, a signal from slot timer 22 is to be enabled. At the conclusion of the scheduling phase, CPU 16 may be configured to accept the interrupt. The values stored in interrupt register 24 and the predetermined basis of priority among the functions waiting to be processed may be used to determine which of the waiting functions will be processed in the next slot. For example, if a background function and a TX are waiting to be processed, CPU 16 may be interrupted by a signal from slot timer 22, and MSM 17 may determine that Tx may have priority over the background function. In some embodiments, a signal from slot timer 22 indicating the start of a next slot may serve as a trigger for MSM 17 to switch from an idle phase to service phase.

Upon the completion of the schedule phase, CPU 16 may shift MSM 17 to an idle phase during which CPU 16 may wait for an interrupt, as such interrupt was enabled in the schedule phase. In some embodiments, interrupts may be enabled only during the idle phase.

In some embodiments, all functions other than Tx and Rx may be processed to completion in less than the time available in a slot. The selection or scheduling of a function to be processed may therefore occur at the expiration of a just-completed slot so that the function to be processed in the next slot may be scheduled In some embodiments, the scheduling of execution of functions by a CPU 16 may be synchronized to the timing of a wireless synchronization entity such as, for example, slot timer 22. For example, the scheduling of functions that may be permitted to interrupt CPU 16 may coincide with signals issued by slot timer 22 indicating that a slot has expired or is about to expire. Other timing devices or intervals may be used as a basis for the synchronization of the scheduling and enabling of a CPU's processing of functions.

In some embodiments the execution of a function during a slot may influence the functions that are to be scheduled in a next slot or the timing of the next slot and may influence when the next slot occurs. For example, the processing of a Tx or Rx function in a slot may take longer than the time available in a slot. It may therefore be necessary to mask an up-coming signal from, for example, slot timer 22 until the Tx or Rx functions have been executed to completion and any corresponding acknowledgements have been received. Similarly, if a first segment of a background function has been executed, the completed segment may issue a signal to indicate that another segment of the background function remains to be processed.

Figure 4:
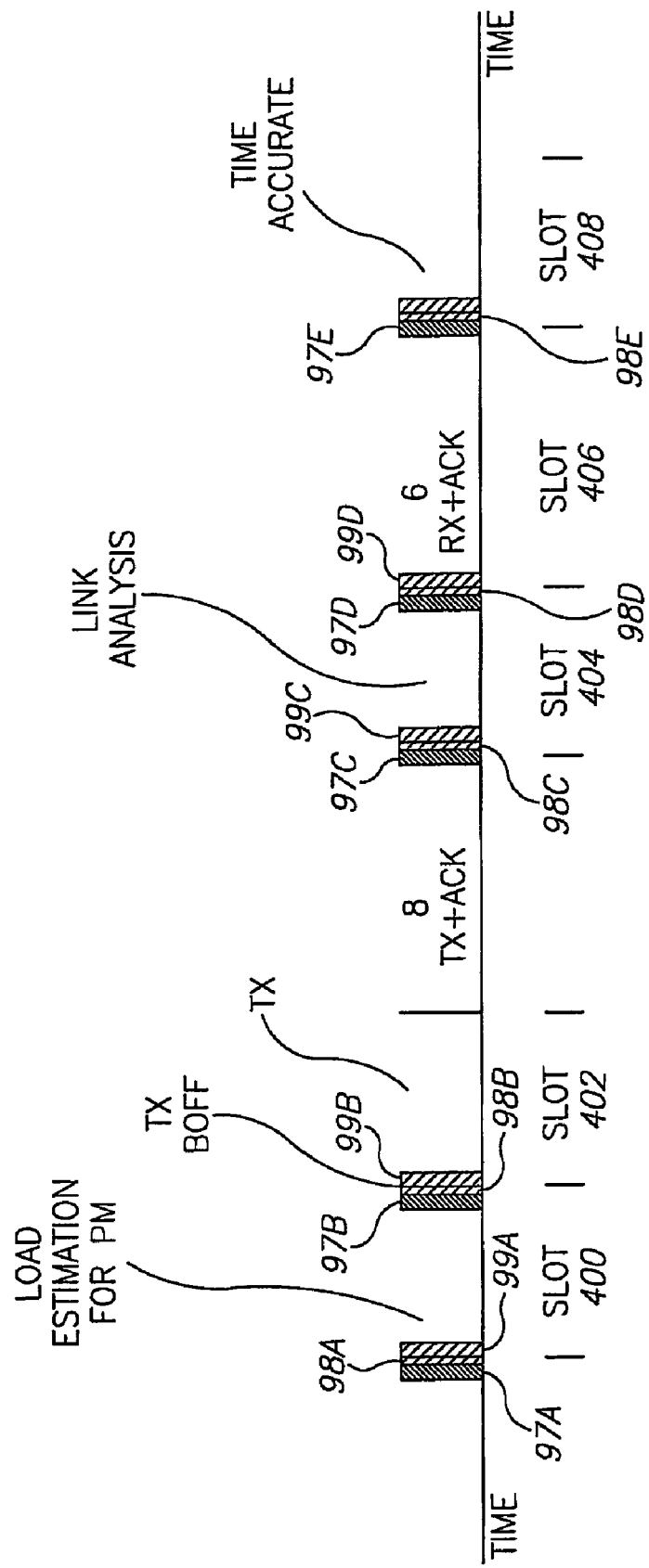
FIG. 4 is a time-line that depicts commands that may be performed by a CPU, and phases of operation of a CPU, in accordance with an exemplary embodiment of the invention.

Reference is made to FIG. 4, a time-line that depicts commands to be performed by a CPU, and phases of operation of an MSM 17 in accordance with an embodiment of the invention. At the beginning of the time line and prior to the start of slot 400, CPU 16 may, for example, have been idle or may have completed processing a function. During scheduling phase 97A in advance of the start of, for example, slot 400, CPU 16 may have determined that a background function such as a load estimation for power management function or command is waiting to be processed. An interrupt of CPU 16 by, for example, slot timer 22 may be enabled and slot 400 may begin. After the schedule phase 97A, CPU 16 may be momentarily idle in an idle phase 98A until the enabled interrupt occurs. MSM 17 may enter a service phase 99A during which a determination may be made as to which, if any of the waiting functions or commands has priority and is therefore to be processed during the slot 400. In the service phase 99A, an 0 or other suitable symbol may be stored in interrupt register 24 which may stop any other commands from interrupting CPU 16 until for example a next slot 402 begins. If the command processed in a slot 400 is completed before the end of the slot 400, CPU 16 may go to scheduling phase 97B.

In slot 402, a time-dependent command (which may correspond to a block or series of machine language commands) such as, for example, a Tx (that may have for example followed a TxBOFF ready signal) may be waiting to be processed, and an indication of the waiting function may be stored in, for example, a designated position of interrupt register 24 during or prior to schedule phase 97B. During the schedule phase 97B in advance of slot 402, MSM 17 may configure an interrupt by slot timer 22. A waiting Tx may be prepared to be issued during the slot 402. After a possible idle period 98B, the preparation for the Tx may begin in service phase 99B.

In some embodiments, processing of the Tx in slot 402 and the ensuing Tx may require a longer period than would usually be available in a slot 402. To keep CPU 16 from being interrupted by, for example, a signal from slot timer 22 during the processing of the Tx, MSM 17 may mask the slot timer signal that would have been issued by slot timer 22 until such time as the Tx function and any acknowledgement (ACK) thereof is completed. In some embodiments the masking may take the form of storing an 0 or other suitable symbol in a designated position of interrupt masking register 28 that corresponds to slot timer 22.

In advance of slot 404, MSM 17 may determine that a background command, such as, for example, a link analysis is waiting to be processed. In schedule phase 97C in advance of slot 404, a interrupt by slot timer 22 may be enabled. At the start of slot 404 and possibly after a brief idle phase 98C, a slot timer signal may interrupt CPU 16. A function such as a link analysis function to be processed in the slot may be selected in service phase 99C and a function may begin to be processed if, for example, there are at that time no higher priority functions waiting for processing.

In advance of slot 406, MSM 17 may determine that both a time-dependent command, such as, for example, a Rx command, and a background command may be waiting to be processed. In schedule phase 97D in advance of slot 406, an interrupt by a slot timer 22 may be configured so that CPU 16 may be interrupted. After possibly a brief idle phase 98D, a determination in service phase 99D may be made that the waiting Rx command has priority over the background function. The Rx command may begin to be processed in service phase 99D during which no interrupts will be permitted until for example the Rx command and any ensuing ACK is completed.

In schedule phase 97E in advance of slot 408, MSM 17 may determine that a time accurate start quiet period is to be initiated. An interrupt by slot timer 22 may be enabled in 97E so that CPU 16 may be interrupted. A determination may also be made that a quiet period timer may be set and all transmissions may be stopped. After possibly a brief idle period 98E, slot timer 22 may interrupt CPU 16. A service period 99E may follow during which the time accurate function may be selected for processing, and the quiet period may begin. Further interrupts may be prohibited during such slot 408. In some embodiments, a background function may be too large to be processed by CPU 16 in the time that is available in a slot. A background command may, for example, be divided into segments of sizes that may be processed to completion within the time available in a slot. The interim results or calculations from one segment may be saved in, for example, a data storage unit such as for example data storage unit 19 in FIG. 1, and such results may later be recalled for the processing of a next segment of the background function. For example, in some embodiments a function such as, for example, a load estimation for power management may be too large to be processed by CPU 16 in a single slot. The function may be divided into segments. A first segment may be selected for processing during a slot. The calculations resulting from such first segment may be stored in a data storage unit 19. A next slot may process a time-dependent function such as, for example, a TX, or if there are no waiting time-dependent or higher priority functions to be processed, a next segment of the background function may be selected for processing. The calculations from the prior slot may, if required, be recalled and the second segment may be processed. In some embodiments, a background function may be segmented into two or more parts that may be processed in consecutive or non-consecutive slots. In some embodiments other functions may be processed after a first of such segments is processed but prior to the processing or all of such segments.

Figure 5:
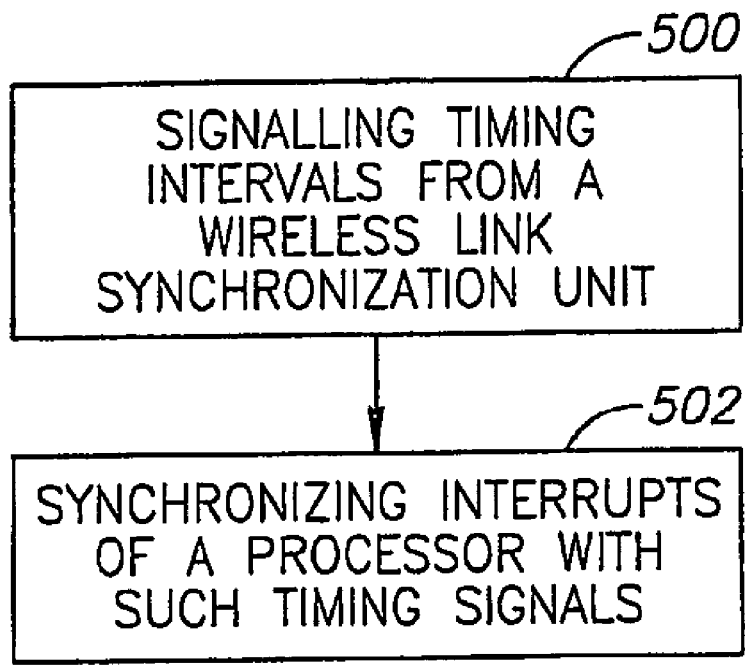
FIG. 5 is a flow chart of the operations of a processor in accordance with an exemplary embodiment of the invention.

Reference is made to FIG. 5, a flow chart of the operations of a CPU or other computing device in accordance with an exemplary embodiment of the invention. In block 500 a timer such as, for example, a wireless link synchronization unit such as, for example, a slot timer 22 may signal the expiration of a slot or other interval. In some embodiments such timer may be a unit that synchronizes frames sequences or other functions of wireless devices. Other timers may be used.

In block 502, interrupts of a CPU or other processor may be synchronized with the signal produced by such timer. For example, in advance of the expiration of a slot and the signal produced by, for example, a slot timer, an MSM 17 may schedule or configure an interrupt of a processor by a slot timer or by a function to be executed by such processor. After possibly a brief idle period, a signal from a timer such as, for example, a slot timer 22 may interrupt the processor. A function or command that may have been waiting will be processed without interruption during the slot.

Figure 6:
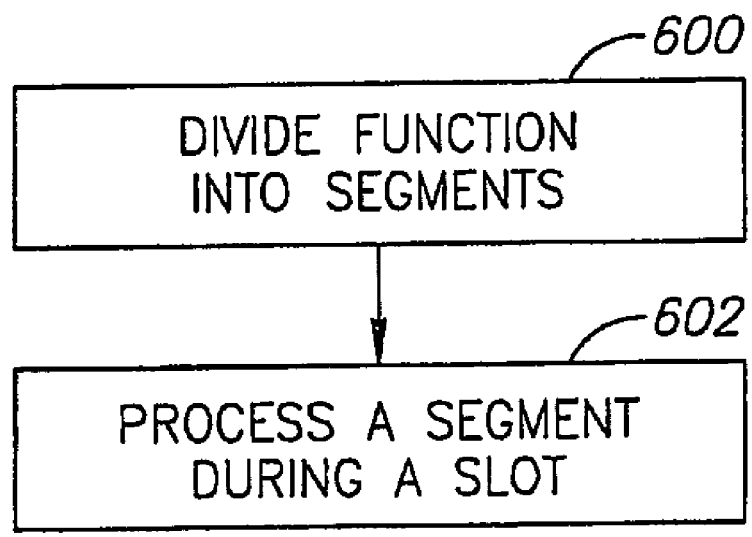
FIG. 6 is a flow chart of a method of dividing commands into segments, in accordance with an exemplary embodiment of the invention.

Reference is made to FIG. 6, a flow chart of a method of dividing background commands into segments, in accordance with an exemplary embodiment of the invention. In block 600, a function such as, for example, a background function may be divided into segments. The segments may be of a size that may be likely to be processed to completion by a processor within the time available in a slot. In block 602, a processor may process a segment during a slot. In some embodiments the results of calculations from the processed segment may, if needed, be stored in, for example, a data storage unit 19. One or more subsequent slots may process one or more of the remaining segments of the background functions using or adding to the stored calculations, until the background function is processed to completion. Processing of other functions may in some embodiments occur in between the slots used to process the divided background function.

Figure 7:
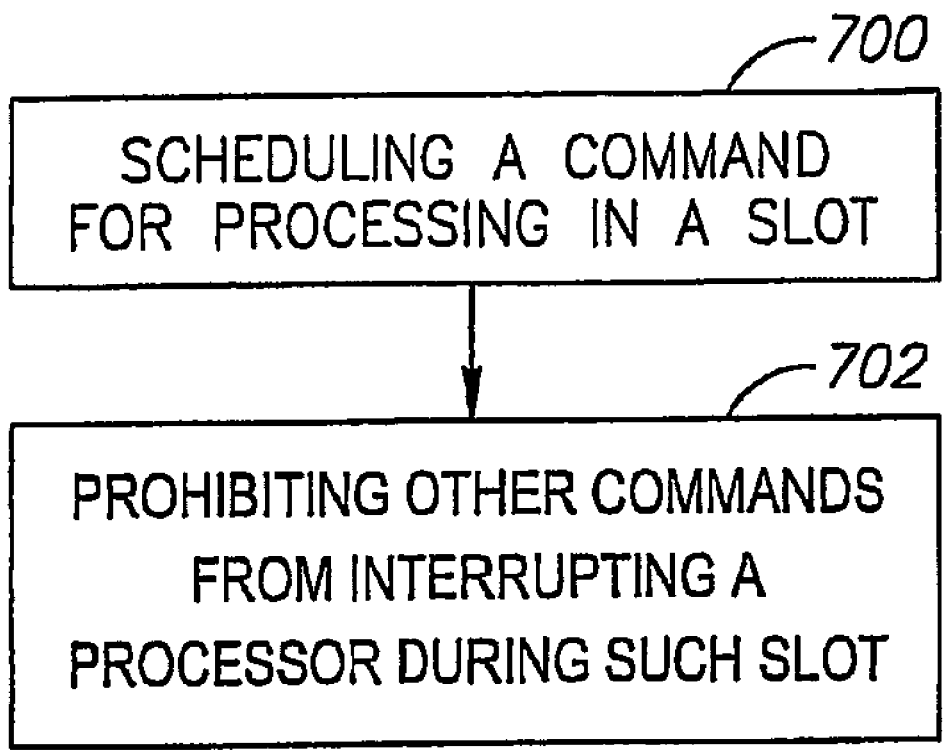
FIG. 7 is a flow chart of a method of prohibiting interrupts by commands during a slot in accordance with an exemplary embodiment of the invention.

Reference is made to FIG. 7, a flow chart of a method of prohibiting interrupts by commands during a slot in accordance with an exemplary embodiment of the invention. In block 700, a command or function such as, for example, a background function may be scheduled for processing in advance of the start of a slot, and may interrupt a CPU at or soon after the start of a slot. In block 702, for the remaining time period of such slot, all further interrupts of the CPU may be prohibited. Further interrupts may be allowed only, for example, at the start of a next slot.

Figure 8:
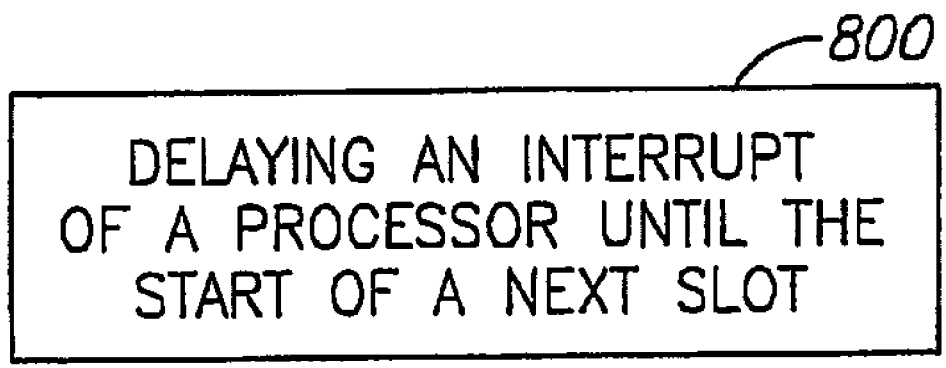
FIG. 8 is a flow chart of a method of delaying an interrupt of a processor until the start of a slot, in accordance with an exemplary embodiment of the invention.

Reference is made to FIG. 8, a flow chart of a method of delaying an interrupt of a processor until the start of a slot, in accordance with an exemplary embodiment of the invention. In block 800, an interrupt of a CPU that may be required to process a function or a command may be delayed during the period of a slot. In some embodiments, a function may arrive to be processed during a period of a slot. During such slot a processor such as a CPU may have already begun processing a different function. The interrupt of the processor by the function may be delayed until the current slot has expired. The arriving function may interrupt a processor at, for example, the start of a next slot.

In some embodiments the invention may be included in an article of manufacture with instructions that when executed may perform a method of the invention. It will be appreciated by persons skilled in the art that embodiments of the invention are not limited by what has been particularly shown and described hereinabove. Rather the scope of at least one embodiment of the invention is defined by the claims below.

I claim:

1. A method for processing by a processor, comprising:
    determining if at least one command is waiting to be processed;
    enabling acceptance of an interrupt in a series of periodic interrupts by a timer if said at least one command is waiting to be processed;
    disabling acceptance of said interrupt if no command is waiting to be processed;
    selecting a command waiting to be processed based on a priority;
    disabling acceptance of interrupts by commands other than said selected command;
    processing at least a portion of said selected command after acceptance of said interrupt; and
    disabling acceptance of interrupts in said series of periodic interrupts until completion of said processing if said processing cannot be completed within the period between consecutive interrupts in said series of periodic interrupts.

2. The method of claim 1, comprising dividing said selected command into at least two or more segments, wherein a segment may be processed to completion within the period between consecutive interrupts in said series of periodic interrupts.

3. The method of claim 2, wherein said selected command is a background command.

4. The method of claim 1, wherein said selected command is a background command if said background command is waiting to be processed and a transmit command, a receive command, a time accurate command, and a command determined to be more important than said background command are not waiting to be processed.

5. The method of claim 1, wherein said selected command is a command if said command waiting to be processed and a receive command is not waiting to be processed.

6. The method of claim 1, wherein said selected command is a receive command if said receive command is waiting to be processed.

7. The method of claim 1, wherein said selected command is a time accurate command if said time accurate command is waiting to be processed and a transmit command and a receive command are not waiting to be processed.

8. The method of claim 1, wherein said selected command is a transmit command if said transmit command is waiting to be processed and a receive command is not waiting to be processed.

9. The method of claim 1, wherein said series of periodic interrupts are synchronized to a wireless link event.

10. The method of claim 1, wherein said series of periodic interrupts are synchronized to the time between frame sequences.

11. A wireless device comprising a processor readable storage medium having instructions for a processor stored thereon that, when executed by the processor, result in:
    determining if at least one command is waiting to be processed;
    enabling acceptance of an interrupt in a series of periodic interrupts by a timer if said at least one command is waiting to be processed;
    disabling acceptance of said interrupt if no command is waiting to be processed;
    selecting a command waiting to be processed based on a priority;
    disabling acceptance of interrupts by commands other than said selected command;
    processing at least a portion of said selected command after acceptance of said interrupt; and
    disabling acceptance of interrupts in said series of periodic interrupts until completion of said processing if said processing cannot be completed within the period between consecutive interrupts in said series of periodic interrupts.

12. The wireless device of claim 11, wherein said selected command is a background command if said background command is waiting to be processed and a transmit command, a receive command, a time accurate command, and a command determined to be more important than said background command are not waiting to be processed.

13. The wireless device of claim 11, wherein said selected command is a command if said command is waiting to be processed and a receive command is not waiting to be processed.

14. The wireless device of claim 11, wherein said selected command is a receive command if said receive command is waiting to be processed.

15. The wireless device of claim 11, wherein said selected command is a time accurate command if said time accurate command is waiting to be processed and a transmit command and a receive command are not waiting to be processed.

16. The wireless device of claim 11, wherein said selected command is a transmit command if said transmit command is waiting to be processed and a receive command is not waiting to be processed.

17. The wireless device of claim 11, wherein said series of periodic interrupts are synchronized to a wireless link event.

18. The wireless device of claim 11, wherein said series of periodic interrupts are synchronized to the time between frame sequences.

19. The wireless device of claim 11, wherein said instructions result in dividing said selected command into at least two or more segments, and wherein a segment may be processed to completion within the period between consecutive interrupts in said series of periodic interrupts.

20. The wireless device of claim 19, wherein said selected command is a background command.

21. A wireless device, comprising:
a processor;
a dipole antenna operably connected to said processor; and
a processor readable storage medium having instructions for said processor stored thereon that, when executed by said processor, result in:
determining if at least one command is waiting to be processed;
enabling acceptance of an interrupt in a series of periodic interrupts by a timer if said at least one command is waiting to be processed;
disabling acceptance of said interrupt it no command is waiting to be processed;
selecting a command waiting to be processed based on a priority;
disabling acceptance of interrupts by commands other than said selected command;
processing at least a portion of said selected command after acceptance of said interrupt; and
disabling acceptance of interrupts in said series of periodic interrupts until completion of said processing if said processing cannot be completed within the period between consecutive interrupts in said series of periodic interrupts.

22. The wireless device of claim 21, wherein said selected command is a background command if said background command is waiting to be processed and a transmit command, a receive command, a time accurate command, and a command determined to be more important than said background command are not waiting to be processed.

23. The wireless device of claim 21, wherein said selected command is a command if said command is waiting to be processed and a receive command is not waiting to be processed.

24. The wireless device of claim 21, wherein said selected command is a receive command if said receive command is waiting to be processed.

25. The wireless device of claim 21, wherein said selected command is a time accurate command if said time accurate command is waiting to be processed and a transmit command and a receive command are not waiting to be processed.

26. The wireless device of claim 21, wherein said selected command is a transmit command if said transmit command is waiting to be processed and a receive command is not waiting to be processed.

27. The wireless device of claim 21, wherein said series of periodic interrupts are synchronized to a wireless link event.

28. The wireless device of claim 21, wherein said series of periodic interrupts are synchronized to the time between frame sequences.

29. The wireless device of claim 21, wherein said instructions result in dividing said selected command into at least two or more segments, and wherein a segment may be processed to completion within the period between consecutive interrupts in said series of periodic interrupts.

30. The wireless device of claim 29, wherein said selected command is a background command.

* * * * *